(No Model.)

L. S. McCRAY.
RUNNER ATTACHMENT FOR WHEELED VEHICLES.

No. 369,728. Patented Sept. 13, 1887.

Witnesses
A. G. Holman
N. T. Chapman

Inventor
L. S. McCray
By James T. Chapman
Attorneys.

N. PETERS, Photo-Lithographer, Washington, D. C.

UNITED STATES PATENT OFFICE.

LORIN S. McCRAY, OF SOUTH HADLEY FALLS, MASSACHUSETTS.

RUNNER ATTACHMENT FOR WHEELED VEHICLES.

SPECIFICATION forming part of Letters Patent No. 369,728, dated September 13, 1887.

Application filed January 17, 1887. Serial No. 224,643. (No model.)

*To all whom it may concern:*

Be it known that I, LORIN S. McCRAY, of South Hadley Falls, in the county of Hampshire and Commonwealth of Massachusetts, have invented a new and useful Improvement in Sleigh-Runner Attachments for Wheeled Vehicles, of which the following is a specification, reference being had to the accompanying drawings, forming part thereof.

My invention relates to devices for attachment to wheeled vehicles, whereby, without removing the wheels, the vehicle will answer all the purposes of an ordinary sleigh; and its object is to provide means for securing this result which will be cheap and simple in construction, readily attached to and removed from the vehicle, and having the required strength and durability.

To these ends my invention consists in the construction and combination of parts hereinafter fully described, and particularly pointed out in the claims.

Figure 1:
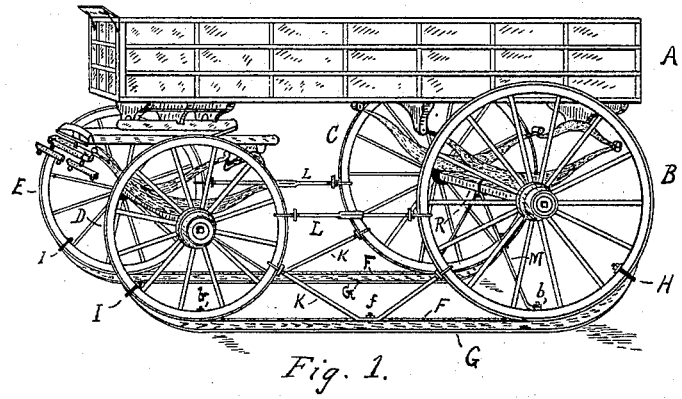

Referring to the drawings, in which like letters designate like parts in the several figures, Figure 1 is a perspective view of a vehicle having applied thereto sleigh-runners constructed according to my invention. Figs. 2, 3, 4, and 5 are detail views of certain parts hereinafter referred to.

The letter A designates the body, B C the rear wheels, and D E the front wheels, of an ordinary spring-wagon, which I have shown to illustrate the application of my invention to vehicles generally.

Two wooden runners, F, (shown in detail in Fig. 5,) are provided with shoes G, in the usual manner, and are of the proper length to extend beneath both the front and rear wheels of the vehicle, and are preferably tapered to a point at the ends and bent to conform to the curve of the periphery of the front and rear wheels, as shown. The runners are provided with a plane surface upon the upper side of proper width to receive the wheels of the vehicle, as shown, or may have a groove in said upper surface slightly wider than the tires of the wheels. At or near the ends the runners are securely held to the front side of the front wheels and to the rear side of the rear wheels by metallic clips H I, passing around the runner and the wheel-felly and tightened by clamp-nuts. Midway between the wheels a brace, K, is secured to each runner by a bolt, $f$, said braces (shown in detail in Fig. 3) consisting of upwardly-diverging arms terminating in clips $k$ and clamp-nuts $p$, by which said arms are firmly secured to the felly of the front and rear wheels, as shown, thus uniting the runners at their middle point to both wheels. In order to still further secure the runners from lateral movement, bolts $b$ are passed upwardly through the runners and the felly of each wheel, said bolts preferably having their heads countersunk in the shoes G, and being inserted through one of the holes in the tire and felly of the wheels usually occupied by the tire-fastening bolts, one of which may be removed for this purpose. By this arrangement the nuts upon the upper end of the bolts securely clamp the wheels to the runners directly beneath the axles in addition to the front and rear fastenings by means of the clips H I and braces K.

Figure 2:
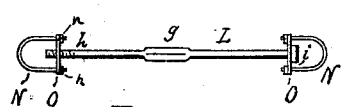
Figure 3:
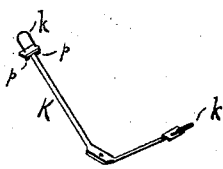
Figure 4:
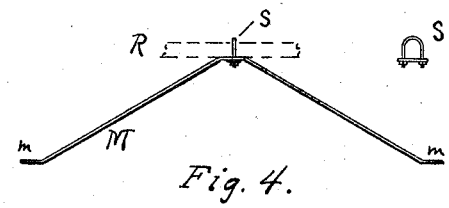
Figure 5:
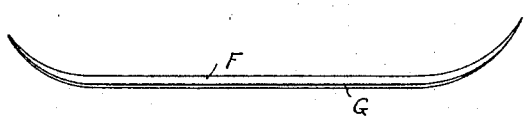

For carriages and other light vehicles, the fastening devices thus far described will be sufficient to securely hold the runners in place and will enable the vehicle to be used like an ordinary sleigh. For heavy wagons, however, and vehicles designed to carry heavy loads, I prefer to employ, in addition to the devices previously described, the tie-rods L and a brace, M. The said tie-rods, one of which is shown in detail in Fig. 2, are provided at the ends with clips N, having cross-plates O and clamp-nuts $n$, each of said rods having a head, $i$, contained within one of said clips, and a screw-threaded end, $h$, entering a screw-threaded orifice in the plate O of the other clip, and a squared central portion, $g$, to receive a wrench. The clips N are placed around the felly of the front and rear wheels at the point of the shortest distance between them, as shown, or above or below such point, and the rods are turned with a wrench to tie said wheels rigidly together.

The brace M (shown in detail in Fig. 4) is secured to the rear axle, R, by means of a clip, S, or in other suitable manner, and at its ends is secured to the runners or to the rear wheels beneath said axle. As shown, the latter connection is made by passing the bolts $b$, previously described, through horizontal feet $m$ on the brace and turning the nuts of said bolts down upon said feet, thereby enabling the bolts to serve a double function. It will be obvious, however, that the feet m could be arranged vertically and bolted to the inner side of the runners or otherwise secured thereto and still permit the brace to accomplish its function, which is to assist the wheels to prevent lateral movement of the runners.

It will be observed that the wooden runners are not essential to the attachment, as above described, as the shoes G could be directly employed without the runners; but I prefer the construction shown and described, as it presents a more finished appearance and gives increased strength and rigidity.

By extending the runners beneath both the front and rear wheels, I am enabled to dispense with the numerous and complex fastening devices required to secure an independent runner to each wheel, and at the same time secure a more rigid and durable attachment.

I do not wish to limit myself to all the details of the construction shown, as it is obvious that modifications could be made therein without departing from the spirit of my invention.

I claim—

1. The combination, with a four-wheeled vehicle, of the runners F, extending beneath both the front and rear wheels, clips I H, securing the ends thereof to said wheels, braces K, secured to said runners between the wheels and having two upwardly-diverging arms, one of said arms being connected at its outer end to the felly of the front wheel and the other being connected in a similar manner to the rear wheel, and bolts $b$, connecting each wheel to one of said runners beneath the axles, substantially as and for the purpose set forth.

2. The combination, with a four-wheeled vehicle, of runners F, having shoes G, clips I H, braces K, tie-rods L, and brace M, arranged and operating substantially in the manner set forth.

3. The combination, with a four-wheeled vehicle, of runners F, clips I H, braces K, bolts $b$, tie-rods L, and brace M, substantially as and for the purpose set forth.

LORIN S. McCRAY.

Witnesses:
W. H. CHAPMAN,
TIMOTHY M. BROWN.